Feb. 28, 1939.  E. REICH  2,148,641
TRANSFORMER FOR ELECTRICAL MEASURING INSTRUMENTS
Filed Feb. 25, 1937  2 Sheets-Sheet 1
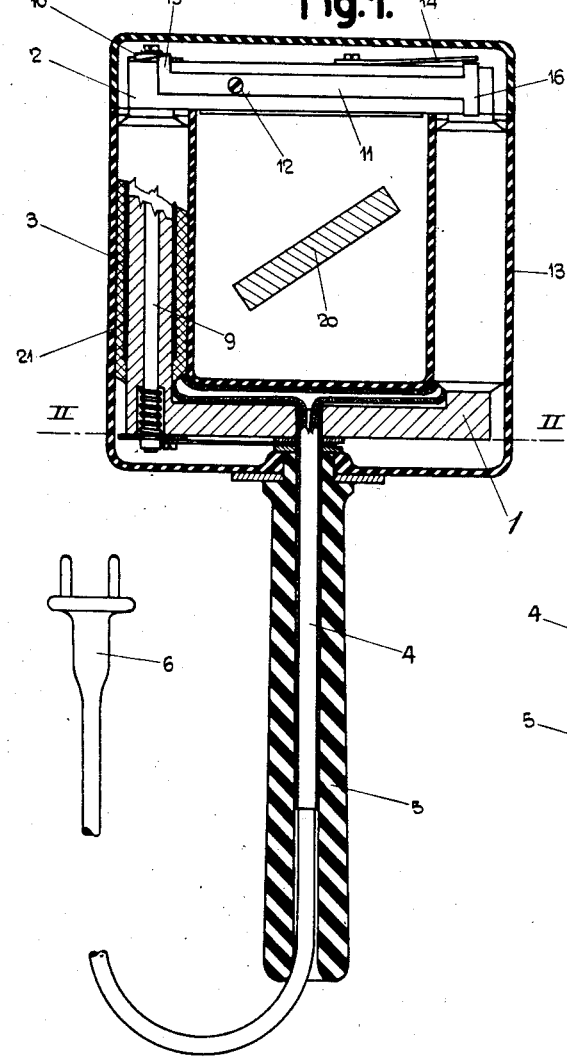
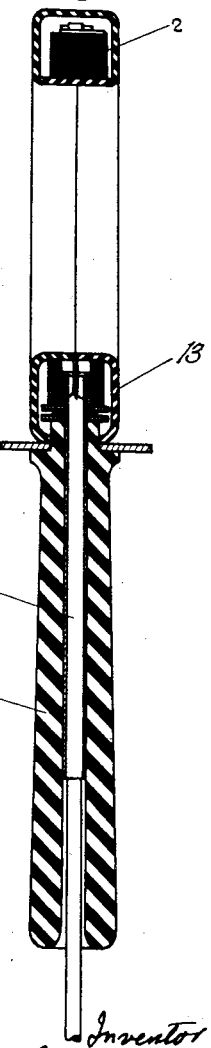

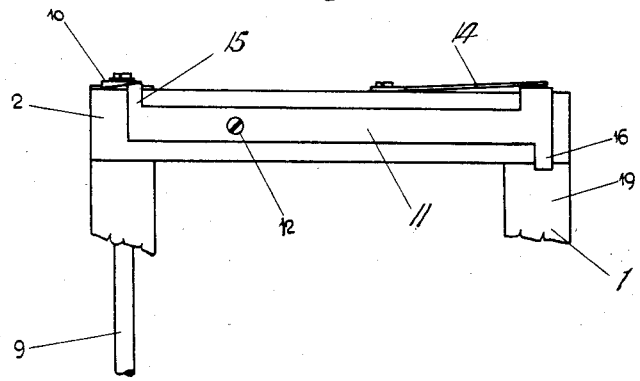
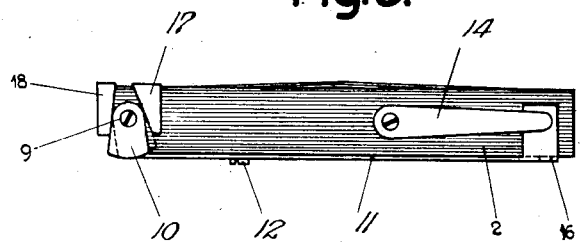
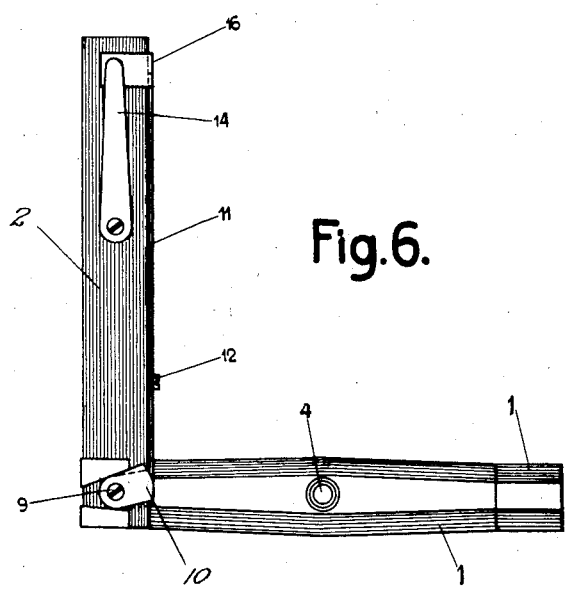

Patented Feb. 28, 1939

2,148,641

UNITED STATES PATENT OFFICE 2,148,641

TRANSFORMER FOR ELECTRICAL MEASURING INSTRUMENTS

Ernö Reich, Budapest, Hungary

Application February 25, 1937, Serial No. 127,720
In Hungary April 9, 1936

9 Claims. (Cl. 175—358)

My invention relates to electric measuring instruments for measuring alternating current in a conductor, of the type which by reason of the adaption of their cores for opening and closing for the purpose of encircling the said conductor are called "tong test instruments."

The main advantage of instruments of this type is that they may be used to measure the current in a conductor without interrupting the circuit of which the conductor forms part or without having to make an electrical connection therewith. Such instruments as have been previously proposed have had cores of pincer-like shape and some have suffered from the disadvantage that owing to this pincer-like shape of their cores it has been necessary to use both hands in opening and closing them. However a more serious disadvantage of this known form of instruments resides in the fact that when the core is in the open position for encircling a conductor, the dimensions of the instrument are considerably increased; when the conductor is one of a number arranged close together this increase in dimensions renders the encircling of the conductor very difficult. If the conductors are bare, dangers of short circuits may easily arise. A further disadvantage of this pincer-like shape core is that it cannot safely be left when fitted to the conductor, as for instance while a record of the reading of the instruments is being taken with the aid of suitable recording instruments, for the reason that the core tends to open and to slip off the conductor. Moreover instruments having current transformers whose cores have to be fixed to the conductors are not suitable for quick measuring or for measuring without first breaking the circuit, particularly when the conductors are bare.

The object of the present invention is to provide an instrument which will have all the advantages of the tong test instruments without suffering from the disadvantages thereof above described.

According to the invention an electric tong test measuring instrument comprises a U-shaped core having a yoke member adapted to more preferably at right angles to the plane of the core; movement of the yoke member is effected advantageously by rotation of an insulated handle through a parallel lever arrangement and the coupling preferably includes a rotatble rod or shaft extending through one limb of the core.

Means may be provided which are actuated upon rotation of the handle for locking the said yoke member in a closed position on the core; when the core is fitted to the conductor it will then remain on the conductor until the handle is rotated to release the locking device and to move the yoke member.

In the preferred construction the insulated handle is arranged in the centre of the core to extend along its axis of symmetry.

Certain preferred embodiments of my invention are illustrated in the accompanying drawings, wherein:

Figure 1 represents a plan view, in part section, of the instrument;

Figure 2 represents a view on the line II—II in Figure 1;

Figure 3 is a part sectional side view;

Figures 4, 5 and 6 illustrate the means for locking the yoke member to the core in the closed position, Figure 4 being a part plan, Figure 5 being an end elevation with the yoke member in closed position and Figure 6 being an end elevation with the yoke member in the full-open position.

Referring to Figures 1, 2 and 3, the magnetic flux path of the U-shaped iron core 1 is closed by the iron yoke member 2 which can be turned at right angles to the plane of the core as shown in Figure 6. The core 1 bears on each of its limbs a coil 3 and the two coils are connected preferably in series through the insulated wires of a cable 4 which is passed through the hollow of a handle 5 rotatively connected to the core 1 and extending therefrom in line with the longitudinal central axis thereof. At its outer end this cable terminates in the usual connecting plug 6, which may be connected to any suitable indicating meter, preferably to a recording ammeter. The handle 5 is of insulating material. In order to enlarge the range of the measuring instruments for different current strengths it is advantageous to provide in addition to the cores 3 short circuited windings such as copper tubes 21 mounted on said limbs whereby the coil tension may be made substantially proportional to the current in the conductors. These copper tubes 21 may be arranged between the coils and the limbs of the core. The presence of these copper tubes moreover will reduce the magnetic pull exerted on the yoke member during the opening and closing operations and will cause a reduction in the effort required to perform the opening operation. A further advantage of this short circuited winding or copper tube is that if the yoke is not quite tightly closed the indication on the ammeter connected to said instrument will be affected only to a very small amount, about 2–5% minus.

The symmetrical arrangement of the coils 3 has the advantage that the ratio of the transformer is rendered independent from the location of the conductor relative to the limbs of the core of the instrument.

Movement of the yoke member 2 is effected by rotating the handle 5 and the rotational movement of this handle is communicated to the shaft 9 on which said yoke member is mounted, through a pair of discs 7 and parallel levers 8. The instrument is covered with insulating material as shown at 13 to prevent short circuit.

Referring now to Figures 4, 5 and 6, a cam lever 10 (Fig. 6) is mounted at the forward or upper end of the shaft 9 to rotate with said shaft. This lever is adapted to cooperate with a locking lever 11 fulcrumed at 12 to said yoke (Fig. 4) and adapted in closed position of said yoke member to lock the latter. When the shaft 9 is turned by means of the handle 5 the cam portion of the lever 10 will engage the bevelled end of a projection or nose 15 provided at one end of the lever 11 and swing the latter about its fulcrum 12. As a result thereof a projection or nose 16 at the other end of the lever, which in locking position is held by a spring 14 in engagement with the core 1, will be swung upwardly or forwardly against the action of said spring unlocking said yoke 2. Provided on the yoke member at both sides and in the path of said lever 10 are abutments 17, 18 with which said lever cooperates to rotate said yoke into and out of the plane of said core. The amount of rotation required depends upon the size, shape and position of the conductor to which the instrument is to be fitted.

When applying the instrument to the conductor 20 (Fig. 1) with the yoke in open position, the core is placed so that its limbs straddle the conductor and bear against both sides thereof. With the core thus fitted to the conductor, the handle 5 is turned in a certain direction so that first the lever 11 will be swung into locking position by the cam portion of the lever 10. On continued rotation of said handle 5 said lever 10 will come into engagement with abutment 18 and in cooperation with the latter turn said yoke 2 into closing position, in which the lower portion of the projection or nose 16 will snap over the core 19 and lock the yoke in closed position (Fig. 1) around the conductor 20. In this position the instrument remains locked and cannot be removed and may be left without any danger of its yoke opening accidentally. It is therefore suitable for use with recording instruments.

To open the yoke for the removal of the core the handle 5 is rotated in the reverse direction. Thereby the cam portion of the lever 10 engages the bevelled end of the nose or projection 15 of the lever 11 and swings the latter around its fulcrum 12, so that the opposite nose 16 against the action of the spring 14 will disengage the core 19 (Fig. 4). On continued rotation of the handle 5 in the same direction the lever 10 will be brought into engagement with abutment 17 and in cooperation with the latter turn the yoke out of the plane of the core 2 at right angles to the central longitudinal axis of said core.

As the limbs of the core bear against the conductor while the yoke is being turned into open or closed position the whole operation can be performed with one hand.

The locking device serves also as an indicator to indicate when the yoke member is correctly positioned relative to the core so that errors in measurement due to misalignment may be avoided.

The instrument according to the invention presents the further special advantage, that even when the conductors are spaced very closely, for instance at a distance of only 30 mm. apart, the core can be easily mounted over and removed from a conductor since the cross-sectional dimensions of the core and its yoke member are considerably smaller than the spacing between the individual conductors.

Modifications may be made in the arrangement of the instrument described above without departing from the spirit of the invention but these will be apparent to those skilled in the art.

Having now particularly described and ascertained the nature of my said invention and in what manner the same is to be performed, I declare that what I claim is:

1. A portable measuring instrument for an alternating current conductor, comprising a U-shaped iron core adapted when in use to straddle the conductor and having insulated coils on its limbs and a yoke mounted over the free ends of said limbs for closing said core on said conductor, said yoke being turnable in a plane at right angles to the longitudinal axis of said core, an insulated rotatable handle extending from said core, means for imparting rotation to said yoke from said handle and means operable from said handle for locking and unlocking said yoke.

2. A portable instrument according to claim 1, in which said yoke is rotatively mounted on a shaft extending through one of said limbs and in which are provided means between said handle and said shaft for rotating the latter when turning the handle and means for transmitting movement to said yoke from said shaft.

3. A portable instrument according to claim 1, in which said yoke is rotatively mounted on a shaft extending through one of said limbs and in which are provided means at one end of said shaft for transmitting motion from said handle to said shaft and means at the other end of said shaft for imparting movement from the latter to said yoke, and means operated from said last named means for locking and unlocking said yoke.

4. In a portable instrument for measuring the current in an electric conductor, a U-shaped core having electric coils on its limbs, a shaft extending through one of the limbs of said core, a yoke rotatively mounted on said shaft and serving to close said core over said conductor, an insulated rotatable handle extending centrally from said core, means connected to said handle for imparting movement to said shaft, means for imparting movement from said shaft to said yoke and means for locking said yoke in closed position, said means being operable from said handle in a single continuous operation.

5. A portable instrument according to claim 4 in which the means for imparting movement from said handle to said shaft include a parallel lever mechanism operable from said handle.

6. A portable instrument according to claim 4 in which said means for imparting movement from said shaft to said yoke include a cam lever operable from said handle and cooperating with abutments on said yoke.

7. A portable instrument according to claim 4 in which said locking means include a locking lever adapted to engage the core body in closed position, said means operable from said handle.

8. In a portable instrument for measuring the current in an electric conductor, an insulated U-shaped iron core having electric coils and short circuited electric means on its limbs, a yoke turnably mounted on the free end of one of said limbs and serving to close said core around said conductor when in use, an insulated hollow turnable handle extending from said core, an electric cable extending through said handle and the wires of which are connected to said coils, said cable terminating in a connection plug, means for imparting movement to said yoke and means for locking said yoke in closed position on said core, both said last named means being operable from said handle by a continuous single rotation thereof.

9. In a portable electrical instrument for measuring the current in a conductor, a centrally recessed iron core having electric windings on its limbs and a yoke relatively mounted on one of the limbs to swing in a plane at a right angle to the later and capable of being locked in closed position, an insulated hollow rotatable handle extending from said core and electric connections leading through said handle to said windings and terminating at their outer end in a connecting plug, said handle being operatively connected to said yoke by means whereby when said instrument straddles the conductor and bears against both sides thereof, the turning of the handle in either direction by one hand of the user will operate the yoke to automatically unlock and then swing said yoke into open position or, vice versa, to swing said yoke into closing and locked position.

ERNÖ REICH.